(12) United States Patent
Kuroki et al.

(10) Patent No.: US 11,987,248 B2
(45) Date of Patent: May 21, 2024

(54) VEHICLE CONTROL DEVICE

(71) Applicants: TOYOTA JIDOSHA KABUSHIKI KAISHA, Toyota (JP); DENSO CORPORATION, Kariya (JP)

(72) Inventors: Shota Kuroki, Toyota (JP); Toshihiro Maruyama, Nagakute (JP); Tomohiko Inoue, Kariya (JP); Norio Tsuchida, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 275 days.

(21) Appl. No.: 17/697,363

(22) Filed: Mar. 17, 2022

(65) Prior Publication Data
US 2022/0306111 A1    Sep. 29, 2022

(30) Foreign Application Priority Data
Mar. 23, 2021  (JP) ................. 2021-048362

(51) Int. Cl.
*B60W 30/14*     (2006.01)
*B60W 30/18*     (2012.01)
*G06V 20/58*     (2022.01)

(52) U.S. Cl.
CPC .... *B60W 30/18154* (2013.01); *B60W 30/143* (2013.01); *G06V 20/584* (2022.01); *B60W 2420/403* (2013.01); *B60W 2520/10* (2013.01); *B60W 2552/05* (2020.02); *B60W 2552/53* (2020.02); *B60W 2555/60* (2020.02); *B60W 2720/106* (2013.01)

(58) Field of Classification Search
None
See application file for complete search history.

(56) References Cited

U.S. PATENT DOCUMENTS

| 10,339,805 | B2 * | 7/2019 | Yamanoi | ............. H04N 23/00 |
| 10,627,812 | B2 * | 4/2020 | Eggert | ............. G05D 1/0088 |
| 10,640,116 | B2 * | 5/2020 | Oyama | ............. G06V 20/584 |
| 11,017,247 | B2 * | 5/2021 | Hayashi | ............. G06T 7/90 |

(Continued)

FOREIGN PATENT DOCUMENTS

| JP | 2006-315491 A | 11/2006 |
| JP | 2006-318446 A | 11/2006 |

(Continued)

*Primary Examiner* — Jonathan M Dager
(74) *Attorney, Agent, or Firm* — Sughrue Mion, PLLC

(57) ABSTRACT

A vehicle control device is configured to: execute vehicle speed maintaining control for causing the vehicle speed to coincide with a set vehicle speed; start first control, for causing the acceleration to coincide with target acceleration for keeping maintaining acceleration no higher than limit acceleration, or second control, for controlling the acceleration such that the vehicle speed is kept no higher than a limit vehicle speed lower than the set vehicle speed, as limit control when a traffic signal correlated distance correlated with a traffic signal distance to a stop instructing traffic signal is determined to become a first threshold or less during execution of the vehicle speed maintaining control; and suspend the vehicle speed maintaining control and the limit control when a driver operates a deceleration operator during execution of the limit control.

4 Claims, 7 Drawing Sheets

(56) References Cited

U.S. PATENT DOCUMENTS

| | | | |
|---|---|---|---|
| 2006/0025918 A1 | 2/2006 | Saeki | |
| 2006/0235615 A1 | 10/2006 | Kato et al. | |
| 2010/0033571 A1* | 2/2010 | Fujita | G06V 20/584 348/149 |
| 2012/0253629 A1* | 10/2012 | Maruyama | B60W 30/16 701/96 |
| 2013/0251209 A1* | 9/2013 | Kim | G06V 20/56 382/106 |
| 2016/0054138 A1* | 2/2016 | Kojo | G01C 21/3602 701/423 |
| 2016/0311431 A1* | 10/2016 | Kato | G01C 21/3617 |
| 2020/0122724 A1* | 4/2020 | Hiramatsu | G08G 1/09 |
| 2020/0310427 A1* | 10/2020 | Oyama | B60W 30/18159 |
| 2022/0009458 A1* | 1/2022 | Wang | B60T 17/18 |
| 2022/0177006 A1* | 6/2022 | Ali | B60W 30/18154 |
| 2022/0340138 A1* | 10/2022 | Seegmiller | B60W 40/04 |
| 2023/0141328 A1* | 5/2023 | Nishimoto | B60W 30/18154 701/93 |
| 2023/0150464 A1* | 5/2023 | Fujii | B60T 8/3205 701/70 |
| 2023/0274644 A1* | 8/2023 | Kameoka | B60W 60/001 |
| 2024/0029568 A1* | 1/2024 | Ramamurthy | G08G 1/167 |

FOREIGN PATENT DOCUMENTS

| | | | |
|---|---|---|---|
| JP | 4172434 | B2 | 10/2008 |
| JP | 4929777 | B2 | 5/2012 |
| JP | 2012-206700 | A | 10/2012 |
| JP | 2014-148293 | A | 8/2014 |

* cited by examiner

FIG. 2
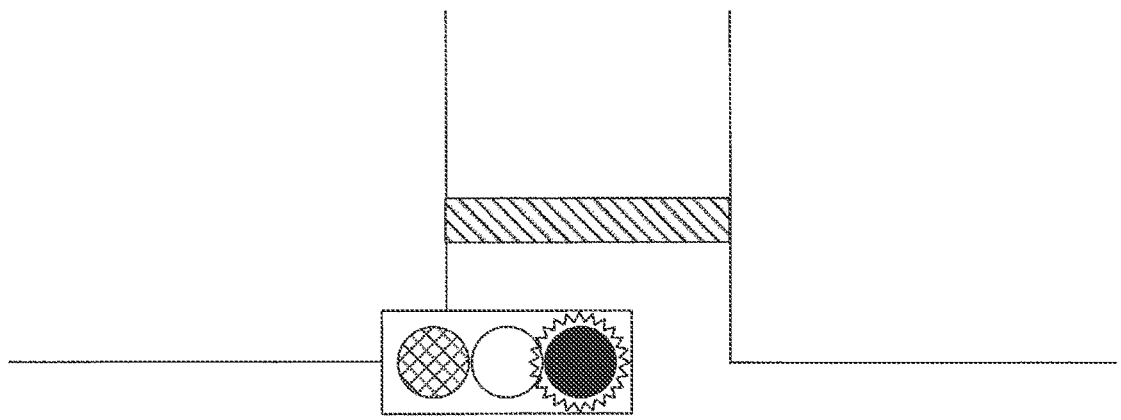
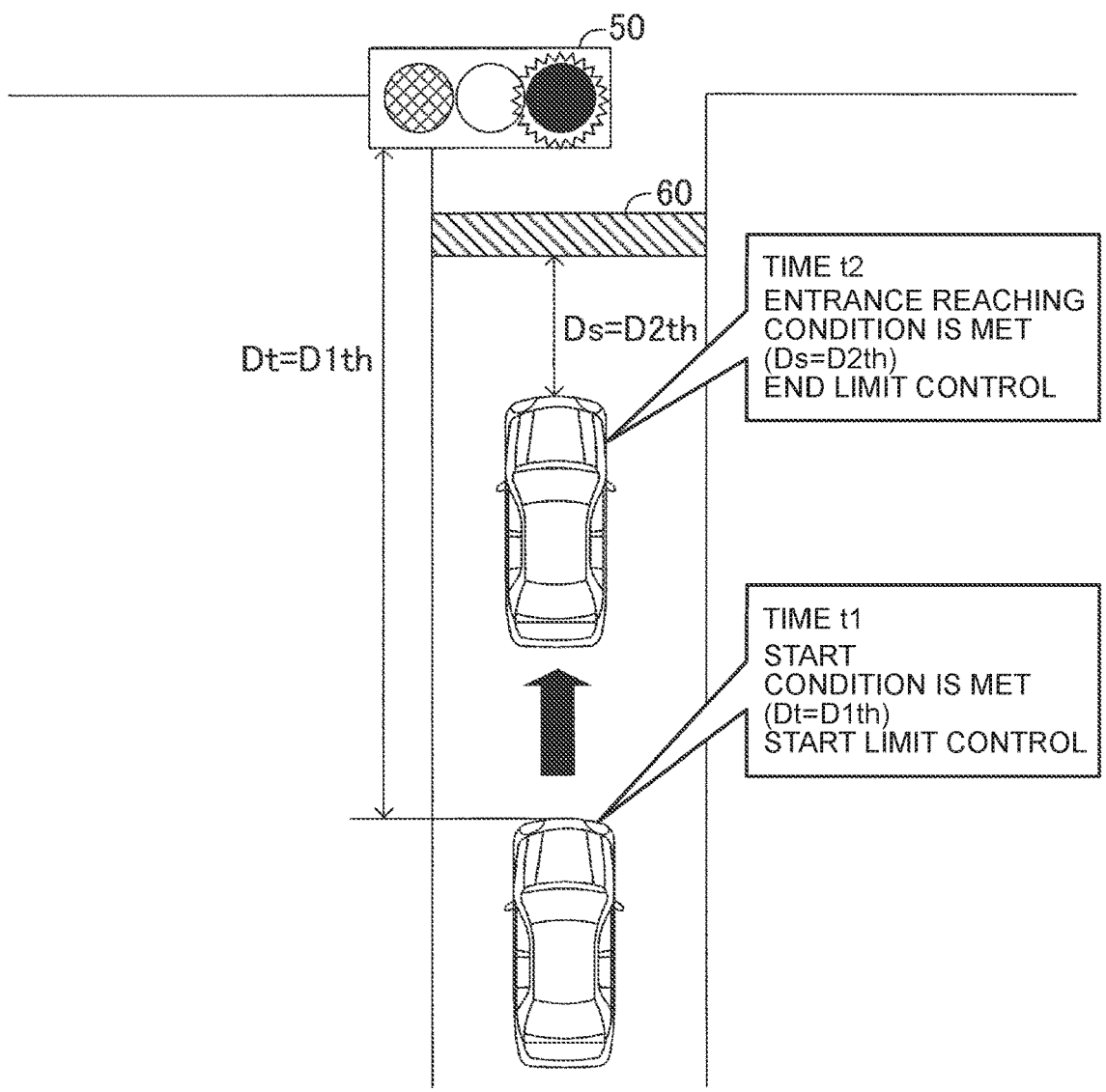

VEHICLE CONTROL DEVICE

CROSS-REFERENCE TO RELATED APPLICATION

This application claims priority to Japanese Patent Application No. 2021-048362 filed on Mar. 23, 2021, incorporated herein by reference in its entirety.

BACKGROUND

1. Technical Field

The present disclosure relates to a vehicle control device. The vehicle control device is used to perform limit control for limiting acceleration or a vehicle speed when a traffic signal providing an instruction to stop is detected during execution of vehicle speed maintaining control for causing a vehicle to travel while maintaining the vehicle speed at a set vehicle speed, for example.

2. Description of Related Art

There is known a vehicle control device that executes vehicle speed maintaining control (constant speed control) for causing a vehicle to travel while maintaining the vehicle speed at a set vehicle speed when no preceding vehicle is present ahead of the vehicle. In a control device (hereinafter referred to as a "related device") described in Japanese Unexamined Patent Application Publication No. 2006-318446 (JP 2006-318446 A), for example, limit control is started so as to make it easy for a driver of a vehicle to perform a brake pedal operation for stopping the vehicle when the "distance between the vehicle and a stop instructing traffic signal" is equal to or less than a threshold during execution of vehicle speed maintaining control. In the limit control, the related device controls the vehicle such that the acceleration of the vehicle coincides with target acceleration for reducing the vehicle speed to a significantly low speed (0 km/h to 10 km/h) that is lower than the set vehicle speed before the distance to the traffic signal becomes shorter than a certain distance.

When the driver performs an operation on a drive operator (e.g., a brake pedal operation) during execution of the limit control, the related device determines that an end condition is met, and ends the limit control.

SUMMARY

The related device maintains the limit control when the vehicle reaches an intersection at which the stop instructing traffic signal is installed without the driver operating the drive operator for a certain reason. Therefore, the vehicle passes through the intersection at the significantly low speed. In this case, it takes a long time for the vehicle to pass through the intersection, which increases the possibility (possibility of contact) that the vehicle contacts another object in the intersection.

The present disclosure provides a vehicle control device that can reduce the possibility of contact at an intersection by shortening the time for a vehicle to pass through the intersection, by ending limit control and resuming vehicle speed maintaining control, when the vehicle reaches an entrance to the intersection without ending the limit control.

A first aspect of the present disclosure provides a vehicle control device. The vehicle control device includes a camera device configured to acquire image data about an image of a region ahead of a vehicle, and an electronic control unit. The electronic control unit is configured to: determine, based on a vehicle speed of the vehicle and a set vehicle speed, maintaining acceleration that is necessary to cause the vehicle speed of the vehicle to coincide with the set vehicle speed; and execute vehicle speed maintaining control for controlling acceleration of the vehicle speed such that the maintaining acceleration and actual acceleration of the vehicle coincide with each other. The electronic control unit is configured to start first control or second control as limit control when the electronic control unit determines that a stop instructing traffic signal is present ahead in a host vehicle lane and that a traffic signal correlated distance becomes equal to or less than a first threshold based on the image data during execution of the vehicle speed maintaining control. The stop instructing traffic signal is a traffic signal instructing the vehicle to stop. The host vehicle lane is a lane in which the vehicle is traveling. The traffic signal correlated distance is a distance correlated with a traffic signal distance that is a distance from the vehicle to the stop instructing traffic signal. The first control is control for controlling the acceleration of the vehicle speed such that target acceleration and the acceleration of the vehicle coincide with each other. The target acceleration is obtained by limiting the maintaining acceleration so as not to become higher than limit acceleration. The second control is control for controlling the acceleration of the vehicle such that the vehicle speed does not become higher than a limit vehicle speed set to a value that is less than the set vehicle speed. The electronic control unit is configured to suspend the vehicle speed maintaining control and the limit control when a driver of the vehicle operates a deceleration operator for decelerating the vehicle during execution of the limit control. The electronic control unit is configured to end the limit control and resume the vehicle speed maintaining control when the electronic control unit determines that the stop instructing traffic signal continuously instructs the vehicle to stop and an entrance reaching condition is met based on the image data during execution of the limit control. The entrance reaching condition is met when the vehicle reaches a position near an entrance to an intersection at which the stop instructing traffic signal is installed.

With the first aspect described above, the limit control is ended and the vehicle speed maintaining control is resumed when the vehicle reaches the vicinity of an entrance to an intersection (i.e. when an entrance reaching condition is met) during execution of the limit control. Consequently, the time required for the vehicle to pass through the intersection can be made shorter than the time for the vehicle to pass through the intersection with the limit control executed. As a result, the possibility that the vehicle contacts another object in the intersection can be reduced.

In the first aspect, the electronic control unit may be configured to determine that the entrance reaching condition is met when the electronic control unit determines that a stop line is present on a road surface ahead in the host vehicle lane based on the image data and a stop line distance between the vehicle and the stop line acquired based on the image data becomes equal to or less than a second threshold during execution of the limit control.

While a traffic signal is occasionally installed at only one of an entrance to and an exit from an intersection, a stop line is generally present at both an entrance to and an exit from an intersection. The possibility that a stop line is present at both an entrance to and an exit from an intersection is higher than the possibility that a traffic signal is present at both an entrance to and an exit from an intersection. With the configuration described above, determination is made that the entrance reaching condition is met when the stop line distance is equal to or less than the second threshold. Thus, it is possible to reliably determine that the entrance reaching condition is met when the vehicle reaches an entrance to an intersection, compared to the case where the traffic signal distance is used. Thus, the limit control can be reliably ended and the vehicle speed maintaining control can be reliably started at an entrance to an intersection.

In the first aspect, the electronic control unit may be configured to determine that the entrance reaching condition is met when the electronic control unit determines that the stop line is not present based on the image data, and the traffic signal distance becomes equal to or less than a third threshold that is smaller than the first threshold.

Determination is made that the entrance reaching condition is met when the traffic signal distance becomes equal to or less than the third threshold, even when determination is made that no stop line is present because of fading etc. of the stop line. With the configuration described above, the limit control can be reliably ended and the vehicle speed maintaining control can be reliably started when the vehicle reaches an entrance to an intersection, even when a stop line cannot be recognized.

In the first aspect, the third threshold may be set to a value that is larger than the second threshold.

With the configuration described above, it is possible to increase the possibility that determination is made that the entrance reaching condition is met when the vehicle reaches an entrance to an intersection, even when a traffic signal is installed only at an exit from the intersection.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 illustrates an overview of operation of the present control device;

DETAILED DESCRIPTION OF EMBODIMENTS

Figure 1:
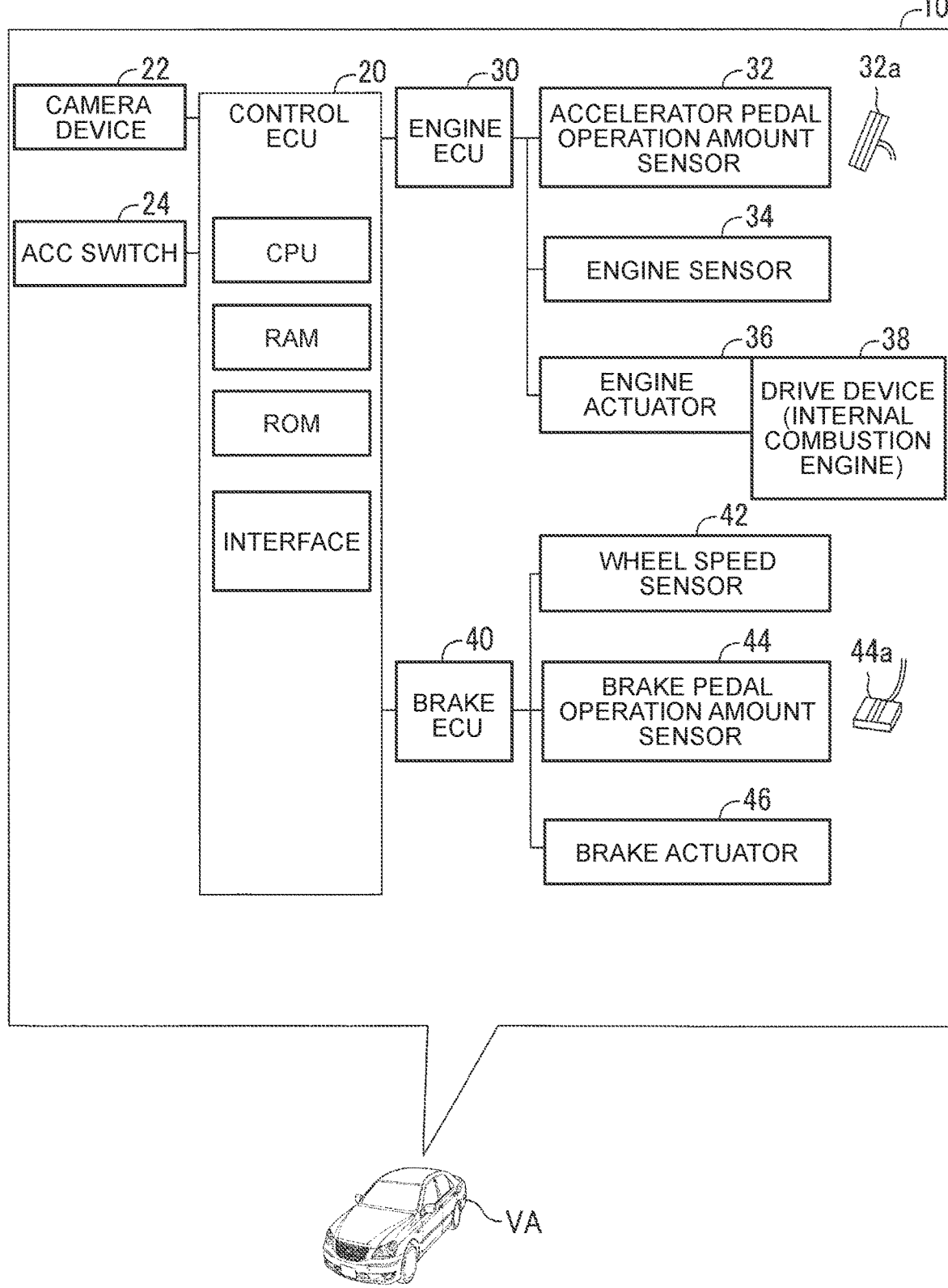
FIG. 1 illustrates a schematic system configuration of a vehicle control device (present control device) according to an embodiment of the present disclosure.

A vehicle control device (hereinafter referred to as "present control device") 10 according to an embodiment of the present disclosure will be described below with reference to the drawings. FIG. 1 illustrates the present control device 10 and a vehicle VA to which the present control device 10 is applied.

As illustrated in FIG. 1, the present control device 10 includes a control electronic control unit (ECU) 20, an engine ECU 30, and a brake ECU 40. These ECUs are connected to each other so as to be able to exchange data (be communicable) via a controller area network (CAN) (not illustrated).

The term "ECU" is an abbreviation of an electronic control unit, which is an electronic control circuit that includes, as a main constituent component, a microcomputer including a central processing unit (CPU), a read only memory (ROM), a random access memory (RAM), an interface, etc. The ECU is occasionally referred to as a "control unit" or a "controller". The CPU implements various functions by executing instructions (a routine) stored in a memory (ROM). All or some of the ECUs 20, 30, and 40 may be integrated into a single ECU.

The present control device 10 further includes a camera device 22 and an adaptive cruise control (hereinafter referred to as "ACC") switch (hereinafter referred to as an "ACC switch") 24. The camera device 22 and the ACC switch 24 are connected to the control ECU 20.

The camera device 22 is disposed at the upper part of a windshield in the vehicle cabin of the vehicle VA. The camera device 22 acquires image data on an image (camera image) of a region ahead of the vehicle VA. The control ECU 20 acquires image data from the camera device 22, detects white lines on a road based on the image data, and specifies whether the detected white lines are each a separation line that separates a lane (hereinafter referred to as a "host vehicle lane") in which the vehicle VA is traveling or a stop line. It is occasionally necessary for the driver to stop the vehicle VA before the vehicle VA reaches a stop line. The control ECU 20 further acquires, based on the image data, the distance to objects (such as vehicles and traffic signals) that are present in the region ahead of the vehicle VA and the direction of such objects with respect to the vehicle VA.

The ACC switch 24 is disposed near a steering wheel (not illustrated) of the vehicle VA. The ACC switch 24 is operated when the driver of the vehicle VA requests the control ECU 20 to start and end the ACC to be discussed later. The ACC switch 24 inputs an operation signal to the control ECU 20 when the ACC switch 24 is operated by the driver. If the operation signal is input to the control ECU 20 in a period in which the ACC is not executed, the control ECU 20 considers the operation signal as an ACC start signal indicating that "the driver is requesting the ACC to be started". If the operation signal is input to the control ECU 20 in a period in which the ACC is executed, on the other hand, the control ECU 20 considers the operation signal as an ACC end signal indicating that "the driver is requesting the ACC to be ended".

Additionally, a setting switch (not illustrated) is provided near the ACC switch 24. The setting switch is operated to change and set a "target following distance for use in following distance control, to be discussed later, in the ACC" and a "set vehicle speed Vset for use in constant-speed control, to be discussed later, in the ACC".

The engine ECU 30 is connected to an accelerator pedal operation amount sensor 32 and an engine sensor 34, and receives detected signals from the sensors.

The accelerator pedal operation amount sensor 32 detects an operation amount (hereinafter referred to as an "accelerator pedal operation amount AP") of an accelerator pedal 32a of the vehicle VA. The engine ECU 30 receives a detected signal indicating the accelerator pedal operation amount AP from the accelerator pedal operation amount sensor 32. The accelerator pedal 32a is an acceleration operator to be operated by the driver in order to accelerate the vehicle VA by increasing a drive force generated by a drive device (an internal combustion engine 38 in the present example) of the vehicle VA.

The accelerator pedal operation amount AP is "0%" when the driver is not operating the accelerator pedal 32a (i.e. when the driver is not stepping on the accelerator pedal 32a). The accelerator pedal operation amount AP becomes larger as the accelerator pedal 32a is depressed more significantly. The accelerator pedal operation amount AP is "100%" when the accelerator pedal 32a is depressed to the maximum.

The control ECU 20 acquires the accelerator pedal operation amount AP by receiving the detected signal indicating the accelerator pedal operation amount AP and received by the engine ECU 30 from the engine ECU 30.

The engine sensor 34 is a sensor that detects an operation state amount of the internal combustion engine 38. The engine sensor 34 may be a throttle valve opening degree sensor, an engine rotational speed sensor, an intake air amount sensor, etc.

The engine ECU 30 is connected to an engine actuator 36 such as "a throttle valve actuator and a fuel injection valve". The engine ECU 30 controls the engine actuator 36 such that an operation target throttle valve opening degree, which is determined based on the accelerator pedal operation amount AP and a vehicle speed Vs, and the throttle valve opening degree coincide with each other. Consequently, torque generated by the internal combustion engine 38 is changed to regulate a drive force of the vehicle VA. When target acceleration Gtgt to be discussed later is received from the control ECU 20, the engine ECU 30 controls the engine actuator 36 such that the larger one of a target throttle valve opening degree (hereinafter an "ACC target throttle valve opening degree") corresponding to the received target acceleration Gtgt and the operation target throttle valve opening degree and the throttle valve opening degree coincide with each other.

The brake ECU 40 is connected to a plurality of wheel speed sensors 42 and a brake pedal operation amount sensor 44, and receives detected signals from the sensors.

The wheel speed sensors 42 are each provided in a corresponding wheel (a right front wheel, a left front wheel, a right rear wheel, or a left rear wheel) of the vehicle VA, and generate one pulse signal (wheel pulse signal) each time the corresponding wheel is rotated by a predetermined angle. The control ECU 20 measures the number of pulses per unit time in a wheel pulse signal transmitted from each wheel speed sensor 42, and calculates the rotational speed (wheel speed) of each wheel based on the measured number of pulses. The control ECU 20 calculates the vehicle speed Vs, which indicates the speed of the vehicle VA, based on the wheel speed of each wheel. By way of example, the control ECU 20 calculates an average value of the wheel speeds of the four wheels as the vehicle speed Vs.

The brake pedal operation amount sensor 44 detects an operation amount (hereinafter referred to as a "brake pedal operation amount BP") of a brake pedal 44a of the vehicle VA. The brake ECU 40 receives a detected signal indicating the brake pedal operation amount BP from the brake pedal operation amount sensor 44. The brake pedal 44a is a deceleration operator to be operated by the driver in order to apply a braking force to the wheels of the vehicle VA.

The brake pedal operation amount BP is "0" when the driver is not operating the brake pedal 44a (i.e. when the driver is not stepping on the brake pedal 44a). The brake pedal operation amount BP becomes larger as the driver depresses the brake pedal 44a more significantly. The brake pedal operation amount BP is "100%" when the brake pedal 44a is depressed to the maximum.

The brake ECU 40 is connected to a brake actuator 46. The brake actuator 46 is a hydraulically controlled actuator. The brake actuator 46 is disposed in a hydraulic circuit (not illustrated) between a "master cylinder (not illustrated) that pressurizes working oil using a force to depress the brake pedal 44a" and a "friction brake device (not illustrated) including wheel cylinders provided for the wheels". The brake actuator 46 regulates a hydraulic pressure to be supplied to the wheel cylinders.

The brake ECU 40 acquires "negative brake target acceleration" based on the brake pedal operation amount BP. More particularly, the value of the brake target acceleration becomes smaller as the brake pedal operation amount BP becomes larger. The hydraulic pressure of working oil to be supplied to the wheel cylinders is controlled by driving the brake actuator 46 based on the acquired brake target acceleration. As a result, a regulated braking force (friction braking force) is generated for each wheel, and thus the acceleration of the vehicle VA is caused to coincide the brake target acceleration. When the target acceleration Gtgt to be discussed later is received from the control ECU 20, the brake ECU 40 controls the brake actuator 46 based on the lower one of the target acceleration Gtgt and the brake target acceleration. When the target acceleration Gtgt has a value of 0 G or more, the brake ECU 40 does not control the brake actuator 46 based on the target acceleration Gtgt.

The ACC will be described. In the ACC, constant-speed control (cruise control: CC) is executed when no preceding vehicle is present ahead of the vehicle VA. The constant-speed control is occasionally referred to as "vehicle speed maintaining control". On the other hand, in the ACC, following distance control is executed when a preceding vehicle is present ahead of the vehicle VA. The preceding vehicle is a vehicle traveling in the host vehicle lane in the same direction as the advancing direction of the vehicle VA, the distance of the preceding vehicle from the vehicle VA being equal to or less than a predetermined distance.

In the constant-speed control, the vehicle VA is caused to travel while maintaining the vehicle speed Vs at the set vehicle speed Vset without requiring the driver to operate the accelerator pedal 32a or the brake pedal 44a. More particularly, in the constant-speed control, the control ECU 20 acquires (calculates through computation) maintaining acceleration Gset, which is acceleration for causing the vehicle speed Vs to coincide with the set vehicle speed Vset. The maintaining acceleration Gset is calculated through proportional-integral control based on the following formula (1), for example. In the formula, K1 is a proportionality constant, K2 is an integration constant, and SgmdV is an integral value of the past deviation dV=(Vset−Vs).

$$Gset = K1 \cdot (Vset - Vs(n)) + K2 \cdot SgmdV \qquad (1)$$

The control ECU 20 controls actual acceleration G of the vehicle VA by controlling the engine actuator 36 and the brake actuator 46 such that the actual acceleration G of the vehicle VA coincides with the maintaining acceleration Gset. The acceleration G of the vehicle VA is acceleration in the front-rear direction of the vehicle VA, and is obtained by differentiating the vehicle speed Vs with respect to time.

In the following distance control, the vehicle VA is caused to follow a preceding vehicle while maintaining the following distance between the preceding vehicle and the vehicle VA at a constant distance without requiring the driver to operate the accelerator pedal 32a or the brake pedal 44a. Examples of the following distance control are described in Japanese Unexamined Patent Application Publication No. 2014-148293 (JP 2014-148293 A), Japanese Unexamined Patent Application Publication No. 2006-315491 (JP 2006-315491 A), Japanese Patent No. 4172434, and Japanese Patent No. 4929777.

Overview of Operation

The control ECU 20 specifies a traffic signal that meets the following conditions as a stop instructing traffic signal based on the image data acquired from the camera device 22.

The traffic signal is positioned on the host vehicle lane and directly faces the vehicle VA.

The traffic signal is instructing the vehicle VA to stop (the red light of the traffic signal is turned on, by way of example).

When there are a plurality of traffic signals that meets the above conditions, the control ECU 20 specifies one of the traffic signals that is the closest to the vehicle VA as the stop instructing traffic signal.

The control ECU 20 starts limit control when a start condition is met during execution of the constant-speed control, the start condition including at least a condition that a traffic signal distance Dt, which is the distance between the vehicle VA and the stop instructing traffic signal, is equal to or less than a first threshold D1$th$.

In the limit control, the engine actuator 36 and the brake actuator 46 are controlled such that the acceleration G of the vehicle VA coincides with "the target acceleration Gtgt which is the lower one of the maintaining acceleration Gset and predetermined limit acceleration Glmt". The limit acceleration Glmt is set in advance to a value ("0" in the present example) that is generally about 0 G. In the following, such limit control will occasionally be referred to as "first control".

When an operation of the brake pedal 44a by the driver (a change in the brake pedal operation amount BP from "0" to a positive value) is detected, the control ECU 20 ends the ACC and the limit control.

When at least one of the following conditions is met, further, the control ECU 20 determines that an end condition is met, and ends the limit control.

A predetermined time or more has elapsed from the time when the limit control is started.

The driver has performed an accelerator override operation. The accelerator override operation is an operation of the accelerator pedal 32a that makes the operation target throttle valve opening degree larger than the ACC target throttle valve opening degree. In other words, the accelerator override operation is an operation of the accelerator pedal 32a that makes acceleration determined based on the accelerator pedal operation amount AP, the vehicle speed Vs, etc. higher than the target acceleration Gtgt for the limit control.

The color of the stop instructing traffic signal has been switched from a color that indicates stop (stop color: normally red) to a color that allows traffic to proceed (proceed color: normally green or blue).

A new preceding vehicle has been detected.

If the vehicle VA arrives at an entrance to an intersection without the brake pedal 44a being operated, the vehicle VA travels through the intersection with the limit control being executed unless the above end condition is met. It takes a long time for the vehicle VA to pass through the intersection if the vehicle VA travels through the intersection with the limit control being executed in this manner, and thus there is a high possibility that the vehicle VA contacts another object while passing through the intersection.

Thus, the control ECU 20 determines whether an entrance reaching condition is met during execution of the limit control. The entrance reaching condition is met when the vehicle reaches a predetermined position in the vicinity of an entrance to an intersection at which the stop instructing traffic signal is installed. When the control ECU 20 determines that the entrance reaching condition is met, the control ECU 20 ends the limit control, and starts the constant-speed control using the set vehicle speed which is set immediately before the limit control is started. When the control ECU 20 determines that the entrance reaching condition is not met, on the other hand, the control ECU 20 continues the limit control unless the above end condition is met.

The control ECU 20 determines that the entrance reaching condition is met when either of the following conditions is met.

A stop line distance Ds between a stop line (hereinafter referred to as an "intersection entrance stop line") near an entrance to an intersection corresponding to the stop instructing traffic signal and the vehicle VA has become equal to or less than a second threshold D2$th$.

The traffic signal distance Dt has become equal to or less than a third threshold D3$th$ when the control ECU 20 does not detect an intersection entrance stop line.

The second threshold D2$th$ and the third threshold D3$th$ are set in advance to values that are smaller than the first threshold D1$th$. The third threshold D3$th$ is set in advance to a value that is larger than the second threshold D2$th$ (i.e. D1$th$>D3$th$>D2$th$).

For example, the acceleration of the vehicle VA does not become higher than the limit acceleration Glmt (generally 0 G) through the limit control, even when the vehicle speed Vs at the time when the limit control is started is lower than the set vehicle speed Vset. Therefore, the vehicle VA travels at the vehicle speed Vs at the time when the limit control is started, which is lower than the set vehicle speed Vset, during execution of the limit control. When the entrance reaching condition is met with the vehicle VA reaching the vicinity of an entrance to an intersection with the limit control being executed, the control ECU 20 ends the limit control, and starts the constant-speed control using the set vehicle speed which is set immediately before the limit control which has been ended is started. Therefore, the vehicle speed Vs is brought closer to the set vehicle speed Vset through the constant-speed control while the vehicle VA is passing through the intersection. As a result, the time for which the vehicle VA passes through the intersection can be shortened compared to the case where the limit control is executed. Consequently, the possibility of contact at an intersection can be reduced.

Operation Example

An example of operation of the present control device 10 will be described with reference to FIG. 2. At time t1, the control ECU 20 determines that the start condition is met with the traffic signal distance Dt from the vehicle VA to a stop instructing traffic signal 50 illustrated in FIG. 2 becoming equal to or less than the first threshold D1$th$, and starts the limit control. At time t2, the control ECU 20 determines that the entrance reaching condition is met with the stop line distance Ds from the vehicle VA to a stop line (intersection entrance stop line) 60 illustrated in FIG. 2 becoming equal to or less than the second threshold D2$th$, and ends the limit control and starts the constant-speed control, in which the set vehicle speed which is set immediately before the limit control is started is used. Therefore, the vehicle VA travels through an intersection while performing the constant-speed control, in which the set vehicle speed which is set immediately before the limit control is started is used, even if the intersection is reached without the end condition being met. Thus, the time for passage through the intersection can be shortened, as a result of which the possibility of contact can be reduced.

Specific Operation

ACC Start/End Determination Routine

The CPU (hereinafter the term "CPU" refers to the CPU of the control ECU 20 unless specifically stated otherwise) of the control ECU 20 executes an ACC start/end determination routine illustrated in the flowchart in FIG. 3 each time a predetermined time elapses.

Figure 3:
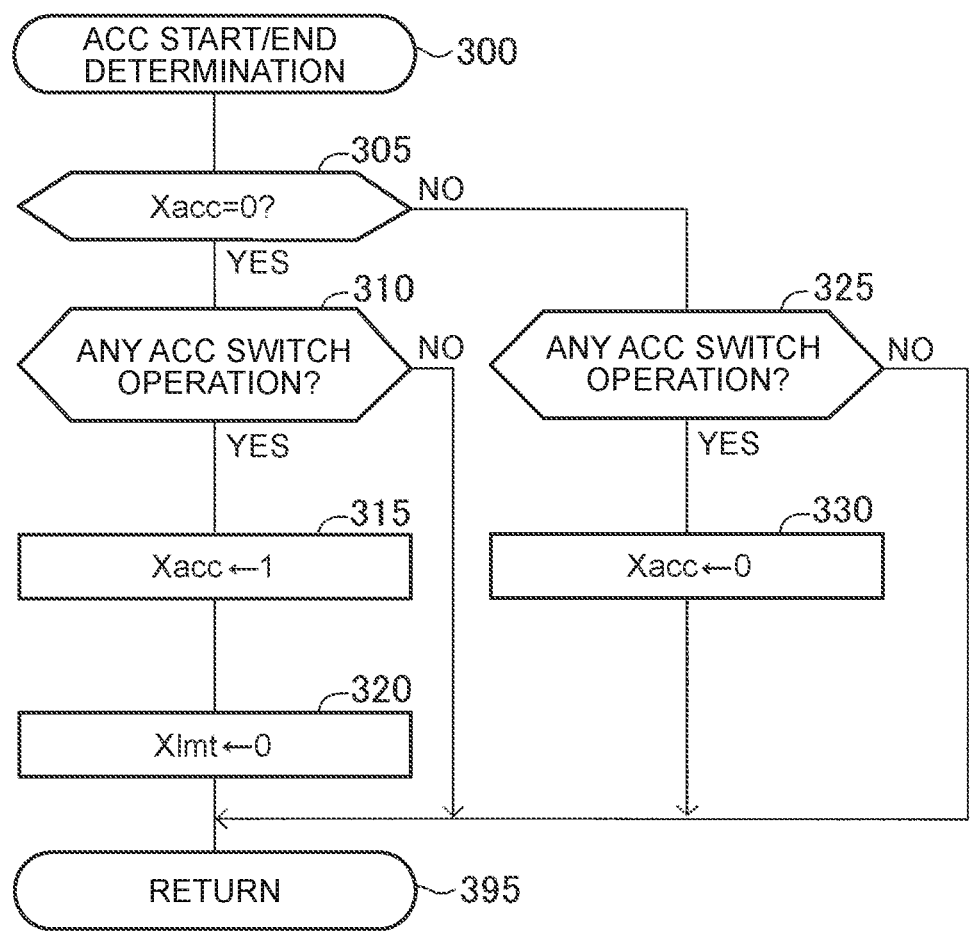
FIG. 3 is a flowchart illustrating an ACC start/end determination routine executed by a central processing unit (CPU) of a control electronic control unit (ECU) illustrated in FIG. 1.

Thus, the CPU starts processing in step 300 in FIG. 3 at a predetermined timing, and proceeds to step 305. In step 305, the CPU determines whether the value of an ACC flag Xacc is "0".

The ACC flag Xacc indicates that the ACC is executed when the value of the flag is "1". The ACC flag Xacc indicates that the ACC is not executed when the value of the flag is "0". The value of the ACC flag Xacc is set to "0" in an initial routine executed by the CPU when an ignition key switch (not illustrated) of the vehicle VA is switched from an off position to an on position.

When the value of the ACC flag Xacc is "0", the CPU determines "Yes" in step 305, and proceeds to step 310. In step 310, the CPU determines whether the ACC switch 24 has been operated.

When the ACC switch 24 has been operated, the CPU determines that the driver has requested the start of the ACC. In this case, the CPU determines "Yes" in step 310, and executes step 315 and step 320. After that, the CPU proceeds to step 395, and temporarily ends the present routine.

Step 315: the CPU sets the value of the ACC flag Xacc to "1".

Step 320: the CPU sets the value of a limit control flag Xlmt to "0".

The limit control flag Xlmt indicates that the limit control is executed when the value of the flag is "1". The limit control flag Xlmt indicates that the limit control is not executed when the value of the flag is "0". In the initial routine described above, the value of the limit control flag Xlmt is set to "0".

When the ACC switch 24 has not been operated when the CPU proceeds to step 310, on the contrary, the CPU determines "No" in step 310, proceeds to step 395, and temporarily ends the present routine.

When the value of the ACC flag Xacc is "1" when the CPU proceeds to step 305, on the other hand, the CPU determines "No" in step 305, and proceeds to step 325. In step 325, the CPU determines whether the ACC switch 24 has been operated.

When the ACC switch 24 has been operated, the CPU determines that the driver has requested the end of the ACC. In this case, the CPU determines "Yes" in step 325, and executes step 330. After that, the CPU proceeds to step 395, and temporarily ends the present routine.

Step 330: the CPU sets the value of the ACC flag Xacc to "0".

When the ACC switch 24 has not been operated when the CPU proceeds to step 325, on the contrary, the CPU determines "No" in step 325, proceeds to step 395, and temporarily ends the present routine.

ACC Routine

Figure 4:
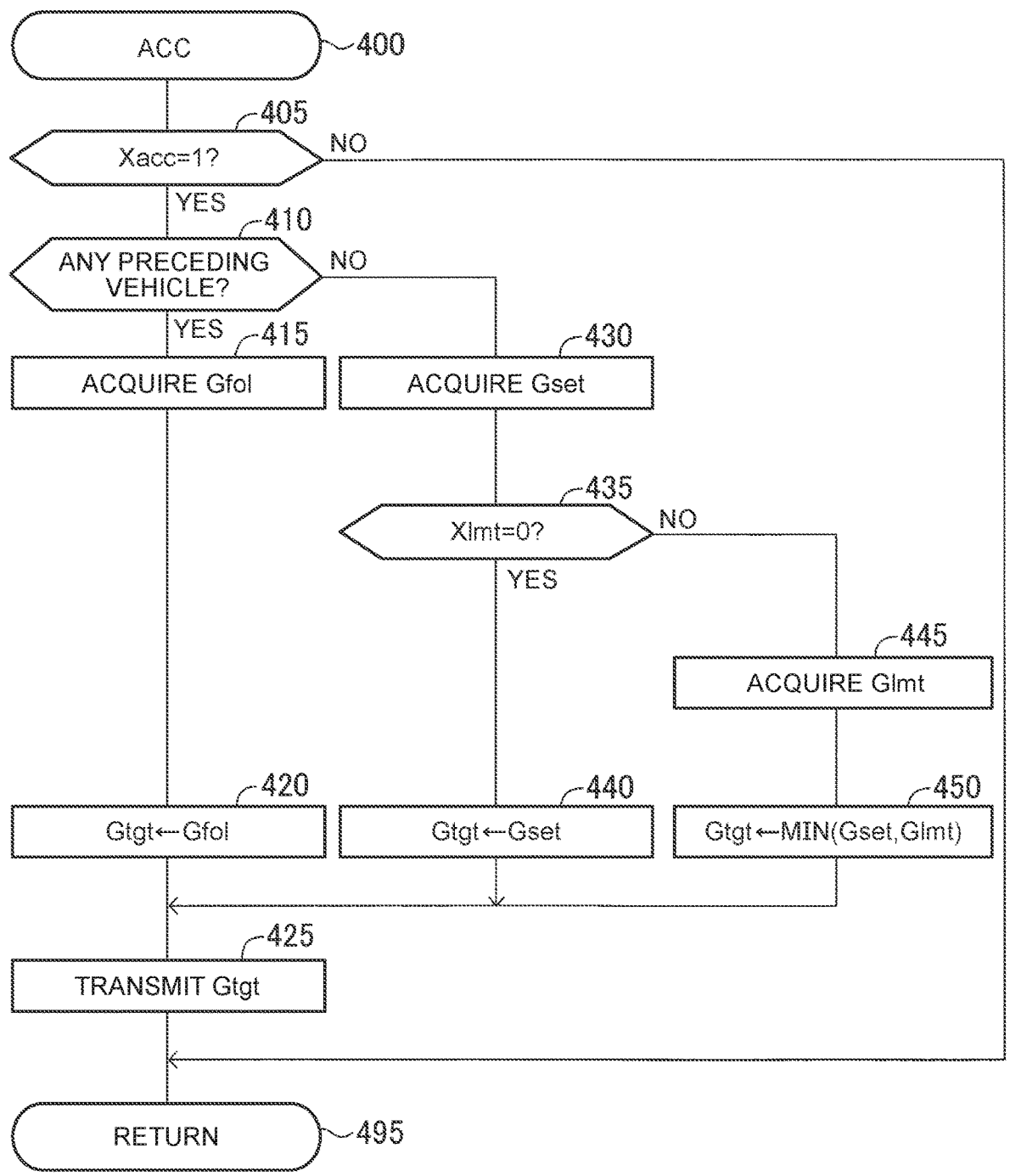
FIG. 4 is a flowchart illustrating an ACC routine executed by the CPU of the control ECU illustrated in FIG. 1.

The CPU executes an ACC routine illustrated in the flowchart in FIG. 4 each time a predetermined time elapses.

Thus, the CPU starts processing in step 400 in FIG. 4 at a predetermined timing, and proceeds to step 405. In step 405, the CPU determines whether the value of the ACC flag Xacc is "1".

When the value of the ACC flag Xacc is "0", the CPU determines "No" in step 405, proceeds to step 495, and temporarily ends the present routine. When the value of the ACC flag Xacc is "1", on the contrary, the CPU determines "Yes" in step 405, and proceeds to step 410.

In step 410, the CPU determines based on the image data acquired from the camera device 22 whether any preceding vehicle is present.

When any preceding vehicle is present, the CPU determines "Yes" in step 410, and sequentially executes the processes in "step 415 to step 425" to be discussed below.

Step 415: the CPU acquires acceleration Gfol for causing the following distance to coincide with a set distance, which is set in advance, based on the distance to the preceding vehicle and the relative speed.

Step 420: the CPU sets the target acceleration Gtgt to the acceleration Gfol.

Step 425: the CPU transmits the target acceleration Gtgt to the engine ECU 30 and the brake ECU 40.

After that, the CPU proceeds to step 495, and temporarily ends the present routine.

When no preceding vehicle is present, on the other hand, the CPU determines "No" in step 410, and sequentially executes the processes in "step 430 and step 435" to be discussed below.

Step 430: the CPU acquires, based on the present vehicle speed Vs, maintaining acceleration Gset for causing the vehicle speed Vs to coincide with the "set vehicle speed Vset which is determined separately based on an operation of the setting switch". The maintaining acceleration Gset is calculated in accordance with the above formula (1).

Step 435: the CPU determines whether the value of the limit control flag Xlmt is "0".

When the value of the limit control flag Xlmt is "0", the CPU determines "Yes" in step 435, and proceeds to step 440. In step 440, the CPU sets the target acceleration Gtgt to the maintaining acceleration Gset. After that, the CPU proceeds to step 425 to transmit the target acceleration Gtgt, and proceeds to step 495 to temporarily end the present routine.

When the value of the limit control flag Xlmt is "1", on the other hand, the CPU determines "No" in step 435, and sequentially executes the processes in "step 445 and step 450" to be discussed below.

Step 445: the CPU acquires the limit acceleration Glmt. While the limit acceleration Glmt is "0" in the present example, the limit acceleration Glmt may have a value that is equal to or less than "0" and that becomes smaller as the set vehicle speed Vset becomes higher.

Step 450: the CPU sets the lower one of the maintaining acceleration Gset and the limit acceleration Glmt to the target acceleration Gtgt. After that, the CPU proceeds to step 425 to transmit the target acceleration Gtgt, and proceeds to step 495 to temporarily end the present routine.

Start Condition Determination Routine

Figure 5:
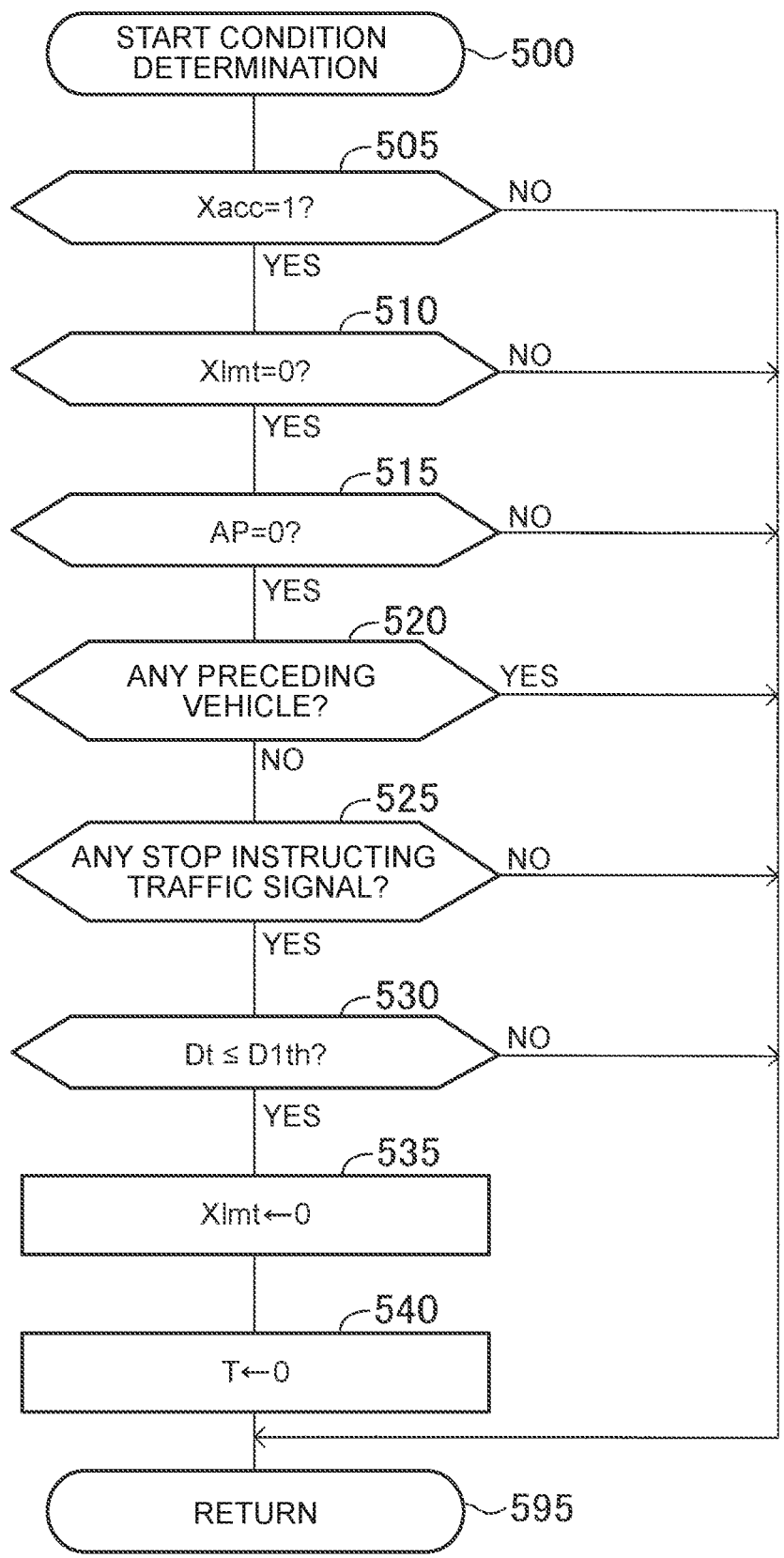
FIG. 5 is a flowchart illustrating a start condition determination routine executed by the CPU of the control ECU illustrated in FIG. 1.

The CPU executes a start condition determination routine illustrated in the flowchart in FIG. 5 each time a predetermined time elapses.

Thus, the CPU starts processing in step 500 in FIG. 5 at a predetermined timing, and proceeds to step 505. In step 505, the CPU determines whether the value of the ACC flag Xacc is "1".

When the value of the ACC flag Xacc is "0", the CPU determines "No" in step 505, proceeds to step 595, and temporarily ends the present routine. When the value of the ACC flag Xacc is "1", on the contrary, the CPU determines "Yes" in step 505, and determines whether the value of the limit control flag Xlmt is "0".

When the value of the limit control flag Xlmt is "0", the CPU determines "Yes" in step 510, and proceeds to step 515. In step 515, the CPU determines whether the accelerator pedal operation amount AP is "0".

When the accelerator pedal operation amount AP is "0" (i.e. when the driver is not operating the accelerator pedal 32a), the CPU determines "Yes" in step 515, proceeds to step 520, and determines based on the image data whether any preceding vehicle is present. When no preceding vehicle is present, the CPU determines "No" in step 520, proceeds to step 525, and determines based on the image data whether any stop instructing traffic signal is present.

When any stop instructing traffic signal is present, the CPU determines "Yes" in step 525, and determines whether the traffic signal distance Dt is equal to or less than the first threshold D1th. When the traffic signal distance Dt is equal to or less than the first threshold D1th, the start condition for the limit control is met. In this case, the CPU determines "Yes" in step 530, and sequentially executes the processes in "step 535 and step 540" to be discussed below. After that, the CPU proceeds to step 595, and temporarily ends the present routine.

Step 535: the CPU sets the value of the limit control flag Xlmt to "1". Step 540: the CPU sets the value of a timer T to "0".

The timer T is a timer that measures the time that has elapsed since the time when the limit control is started.

When the value of the limit control flag Xlmt is "1" when the CPU proceeds to step 510, the CPU determines "No" in step 510, proceeds to step 595, and temporarily ends the present routine.

When the accelerator pedal operation amount AP is larger than "0" when the CPU proceeds to step 515, the CPU determines "No" in step 515, proceeds to step 595, and temporarily ends the present routine.

When any preceding vehicle is present when the CPU proceeds to step 520, the CPU determines "Yes" in step 520, proceeds to step 595, and temporarily ends the present routine.

When no stop instructing traffic signal is present when the CPU proceeds to step 525, the CPU determines "No" in step 525, proceeds to step 595, and temporarily ends the present routine.

When the traffic signal distance Dt is more than the first threshold D1th when the CPU proceeds to step 530, the CPU determines "No" in step 530, proceeds to step 595, and temporarily ends the present routine.

End Condition Determination Routine

Figure 6:
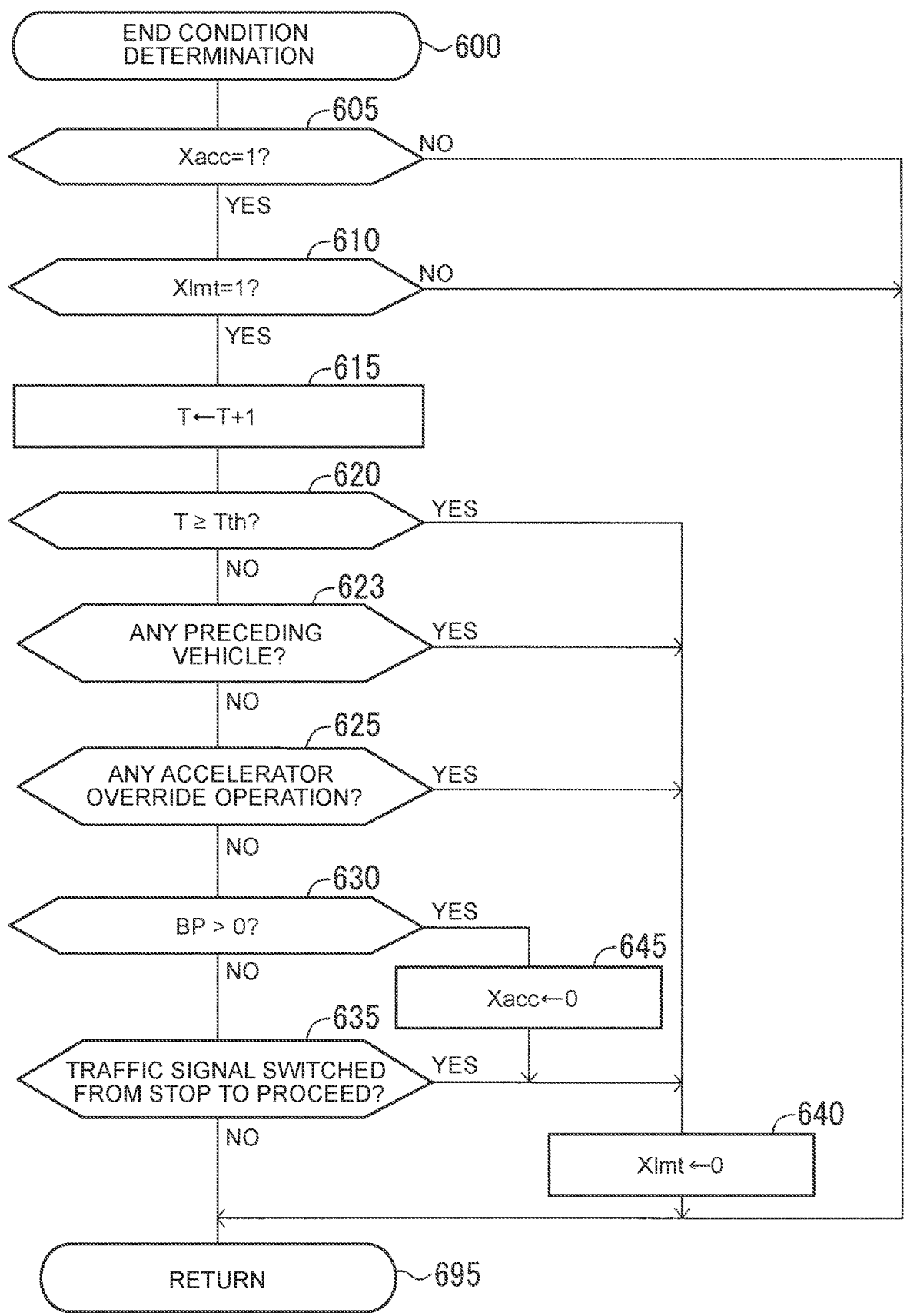
FIG. 6 is a flowchart illustrating an end condition determination routine executed by the CPU of the control ECU illustrated in FIG. 1.

The CPU executes an end condition determination routine illustrated in the flowchart in FIG. 6 each time a predetermined time elapses.

Thus, the CPU starts processing in step 600 in FIG. 6 at a predetermined timing, and proceeds to step 605. In step 605, the CPU determines whether the value of the ACC flag Xacc is "1".

When the value of the ACC flag Xacc is "0", the CPU determines "No" in step 605, proceeds to step 695, and temporarily ends the present routine. When the value of the ACC flag Xacc is "1", on the contrary, the CPU determines "Yes" in step 605, and proceeds to step 610. In step 610, the CPU determines whether the value of the limit control flag Xlmt is "1".

When the value of the limit control flag Xlmt is "0", the CPU determines "No" in step 610, proceeds to step 695, and temporarily ends the present routine. When the value of the limit control flag Xlmt is "1", on the contrary, the CPU determines "Yes" in step 610, and sequentially executes the processes in "step 615 and step 620" to be discussed below.

Step 615: the CPU adds "1" to the value of the timer T. Step 620: the CPU determines whether the value of the timer T is equal to or more than a threshold Tth.

When the value of the timer T is less than the threshold Tth, the CPU determines "No" in step 620, and proceeds to step 623. In step 623, the CPU determines based on the image data whether any preceding vehicle is present. When no preceding vehicle is present, the CPU determines "No" in step 623, and proceeds to step 625. In step 625, the CPU determines whether an accelerator override operation has been performed by the driver.

When an accelerator override operation has not been performed, the CPU determines "No" in step 625, and proceeds to step 630. In step 630, the CPU determines whether the brake pedal operation amount BP is larger than "0". When the brake pedal operation amount BP is "0" (i.e. when the brake pedal 44a has not been operated), the CPU determines "No" in step 630, and proceeds to step 635.

In step 635, the CPU determines based on the image data whether the color of the stop instructing traffic signal has been switched from the stop color to the proceed color. When the color of the stop instructing traffic signal has not been switched from the stop color to the proceed color, the CPU determines "No" in step 635, proceeds to step 695, and temporarily ends the present routine.

When the value of the timer T is equal to or more than the threshold Tth when the CPU proceeds to step 620, the CPU determines "Yes" in step 620, proceeds to step 640, and sets the value of the limit control flag Xlmt to "0". After that, the CPU proceeds to step 695, and temporarily ends the present routine.

When any preceding vehicle is present when the CPU proceeds to step 623, the CPU determines "Yes" in step 623, proceeds to step 640, and sets the value of the limit control flag Xlmt to "0". After that, the CPU proceeds to step 695, and temporarily ends the present routine.

When an accelerator override operation has been performed when the CPU proceeds to step 625, the CPU determines "Yes" in step 625, sets the value of the limit control flag Xlmt to "1" in step 640, proceeds to step 695, and temporarily ends the present routine.

When the brake pedal operation amount BP is larger than "0" (i.e. when the driver has operated the brake pedal 44a) when the CPU proceeds to step 630, the CPU determines "Yes" in step 630, and proceeds to step 645. In step 645, the CPU sets the value of the ACC flag Xacc to "0". After that, the CPU sets the value of the limit control flag Xlmt to "1" in step 640, proceeds to step 695, and temporarily ends the present routine.

When the color of the stop instructing traffic signal has been switched from the stop color to the proceed color when the CPU proceeds to step 635, the CPU determines "Yes" in step 635, sets the value of the limit control flag Xlmt to "1" in step 640, proceeds to step 695, and temporarily ends the present routine.

Determination of Entrance Reaching Condition

Figure 7:
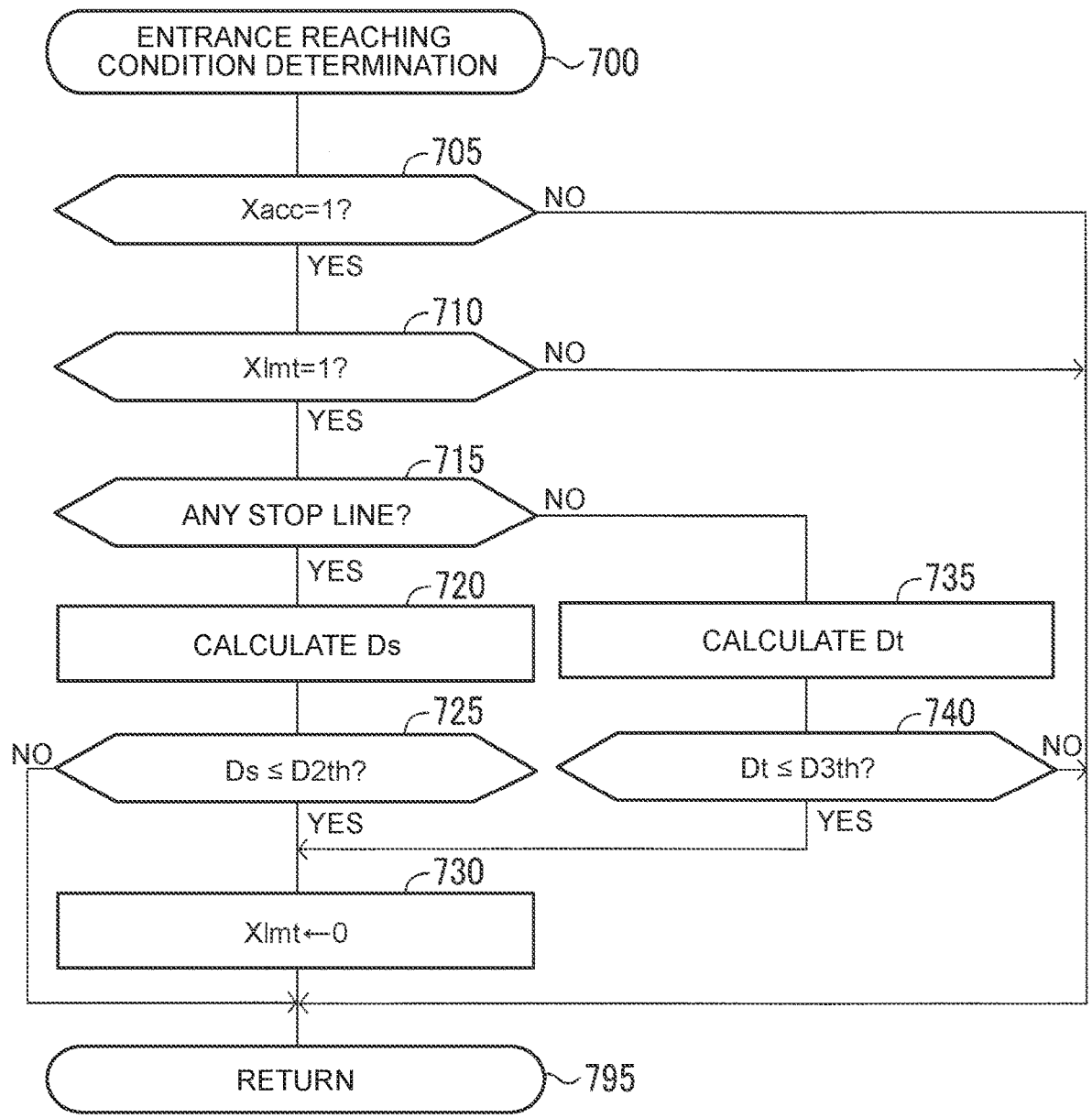
FIG. 7 is a flowchart illustrating an entrance reaching condition determination routine executed by the CPU of the control ECU illustrated in FIG. 1.

The CPU executes an entrance reaching condition determination routine illustrated in the flowchart in FIG. 7 each time a predetermined time elapses.

Thus, the CPU starts processing in step 700 in FIG. 7 at a predetermined timing, and proceeds to step 705. In step 705, the CPU determines whether the value of the ACC flag Xacc is "1". When the value of the ACC flag Xacc is "0", the CPU determines "No" in step 705, proceeds to step 795, and temporarily ends the present routine. When the value of the ACC flag Xacc is "1", on the contrary, the CPU determines "Yes" in step 705, and proceeds to step 710.

In step 710, the CPU determines whether the value of the limit control flag Xlmt is "1". When the value of the limit control flag Xlmt is "0", the CPU determines "No" in step 710, proceeds to step 795, and temporarily ends the present routine. When the value of the limit control flag Xlmt is "1", on the contrary, the CPU determines "Yes" in step 710, and proceeds to step 715.

In step 715, the CPU determines based on the image data whether any intersection entrance stop line is present in the host vehicle lane. When any intersection entrance stop line is present, the CPU determines "Yes" in step 715, and sequentially executes the processes in "step 720 and step 725" to be discussed below.

Step 720: the CPU acquires the stop line distance Ds based on the image data. When a plurality of stop lines is present in the host vehicle lane, the CPU considers one of the stop lines that is the closest to the vehicle VA as an intersection entrance stop line, and acquires the distance between the intersection entrance stop line and the vehicle VA as the stop line distance Ds.

Step 725: the CPU determines whether the stop line distance Ds is equal to or less than the second threshold D2th. The second threshold D2th is set to a value that is smaller than the first threshold D1th.

When the stop line distance Ds is more than the second threshold D2th, the CPU determines "No" in step 725, proceeds to step 795, and temporarily ends the present routine. When the stop line distance Ds is equal to or less than the second threshold D2th, on the other hand, the CPU determines "Yes" in step 725, and proceeds to step 730. In step 730, the CPU sets the value of the limit control flag Xlmt to "0", proceeds to step 795, and temporarily ends the present routine.

When no intersection entrance stop line is present in the host vehicle lane when the CPU proceeds to step 715, the CPU determines "No" in step 715, and sequentially executes the processes in "step 735 and step 740" to be discussed below.

Step 735: the CPU acquires the traffic signal distance Dt based on the image data.
Step 740: the CPU determines whether the traffic signal distance Dt is equal to or less than the third threshold D3th. The third threshold D3th is set to a value that is larger than the second threshold D2th and that is smaller than the first threshold D1th.

When the traffic signal distance Dt is more than the third threshold D3th, the CPU determines "No" in step 740, proceeds to step 795, and temporarily ends the present routine. When the traffic signal distance Dt is equal to or less than the third threshold D3th, on the contrary, the CPU determines "Yes" in step 740, and sets the value of the limit control flag Xlmt to "0" in step 730. After that, the CPU proceeds to step 795, and temporarily ends the present routine.

With the present routine, the CPU determines that the entrance reaching condition is met when the stop line distance Ds is equal to or less than the second threshold D2th when any intersection entrance stop line is present ("Yes" in step 725), or when the traffic signal distance Dt is equal to or less than the third threshold D3th when no intersection entrance stop line is present ("Yes" in step 740). In this case, the CPU ends the limit control by setting the value of the limit control flag Xlmt to "0". Consequently, the limit control is ended when the vehicle VA has reached the vicinity of an entrance to an intersection with the end condition not met, and the constant-speed control in which the set vehicle speed set immediately before the start of the limit control is used is resumed. Thus, the time for which the vehicle VA passes through the intersection can be shortened. Hence, the possibility that the vehicle VA contacts another object at an intersection can be reduced.

The possibility that a stop line is present at an entrance to an intersection is higher than the possibility that a traffic signal is not installed at an entrance to an intersection but is installed at an exit from an intersection. When a traffic signal is present only at an exit from an intersection, the vehicle VA may have already entered the intersection after passing through an entrance to the intersection when the traffic signal distance Dt has become equal to or less than the third threshold D3th. Therefore, the CPU preferentially determines whether the stop line distance Ds is equal to or less than the second threshold D2th, by determining whether the traffic signal distance Dt is equal to or less than the third threshold D3th only when no stop line is present. Hence, it is possible to determine more accurately that the vehicle VA has reached an entrance to an intersection.

The present disclosure is not limited to the embodiment described above, and a variety of modifications can be adopted within the scope of the present disclosure.

For example, the CPU may determine whether the start condition is met using a condition that the stop line distance Ds is equal to or less than a fourth threshold D4th, in place of a condition that the traffic signal distance Dt is equal to or less than the first threshold D1th. The fourth threshold D4th is set to a value that is less than the first threshold D1th and that is more than the third threshold D3th (i.e. D1th>D4th>D3th). In such a modification, when "Yes" is determined in step 525 illustrated in FIG. 5, the CPU determines whether the stop line distance Ds is equal to or less than the fourth threshold D4th, in place of step 530. The CPU proceeds to step 535 when the stop line distance Ds is equal to or less than the fourth threshold D4th, and proceeds to step 595 when the stop line distance Ds is more than the fourth threshold D4th.

The stop line distance Ds is longer as the traffic signal distance Dt is longer, and is shorter as the traffic signal distance Dt is shorter. Thus, the stop line distance Ds is correlated with the traffic signal distance Dt. In the following, the traffic signal distance Dt and the stop line distance Ds are occasionally collectively referred to as a "traffic signal correlated distance".

The CPU may determine that the start condition is met if the stop line distance Ds is equal to or less than the fourth threshold D4th when an intersection entrance stop line is detected, and determine that the start condition is met if the traffic signal distance Dt is equal to or less than the first threshold D1th when an intersection entrance stop line is not detected.

The CPU may end the ACC during execution of the ACC on condition that the driver has performed an accelerator override operation. In such a modification, when "Yes" is determined in step 625 illustrated in FIG. 6, the CPU proceeds to step 645 to set the value of the limit control flag Xlmt to "0", and thereafter proceeds to step 640 to set the value of the ACC flag Xacc to "0".

In the limit control, the CPU may acquire acceleration for causing the vehicle speed Vs to coincide with a limit vehicle speed Vlmt, which is lower than the set vehicle speed Vset, as the limit acceleration Glmt, and set the lower one of the maintaining acceleration Gset and the limit acceleration Glmt as the target acceleration Gtgt. Such limit control for limiting the vehicle speed Vs becoming higher than the limit vehicle speed Vlmt is occasionally referred to as "second control". In such a modification, the CPU acquires acceleration for causing the vehicle speed Vs to coincide with the limit vehicle speed Vlmt as the limit acceleration Glmt in step 445 illustrated in FIG. 4, and proceeds to step 450.

The accelerator pedal 32*a* is not limited to a pedal to be operated by a foot of the driver, and may be a lever etc. to be operated by a hand of the driver, for example.

The camera device 22 may detect a white line and specify whether the white line is a separation line or a stop line based on the image data. The camera device 22 may acquire the distance and the direction to an object and a stop line based on the image data.

The present control device 10 is also applicable to electric vehicles and hybrid electric vehicles.

What is claimed is:

1. A vehicle control device comprising:
a camera device configured to acquire image data about an image of a region ahead of a vehicle; and
an electronic control unit configured to
determine, based on a vehicle speed of the vehicle and a set vehicle speed, maintaining acceleration that is necessary to cause the vehicle speed of the vehicle to coincide with the set vehicle speed,
execute vehicle speed maintaining control for controlling acceleration of the vehicle speed such that the maintaining acceleration and actual acceleration of the vehicle coincide with each other,
start first control or second control as limit control when the electronic control unit determines that a stop instructing traffic signal is present ahead in a host vehicle lane and a traffic signal correlated distance becomes equal to or less than a first threshold based on the image data during execution of the vehicle speed maintaining control, the stop instructing traffic signal being a traffic signal instructing the vehicle to stop, the host vehicle lane being a lane in which the vehicle is traveling, the traffic signal correlated distance being a distance correlated with a traffic signal distance that is a distance from the vehicle to the stop instructing traffic signal, the first control being control for controlling the acceleration of the vehicle speed such that target acceleration and the acceleration of the vehicle coincide with each other, the target acceleration being obtained by limiting the maintaining acceleration so as not to become higher than limit acceleration, and the second control being control for controlling the acceleration of the vehicle such that the vehicle speed does not become higher than a limit vehicle speed set to a value that is less than the set vehicle speed,
suspend the vehicle speed maintaining control and the limit control when a driver of the vehicle operates a deceleration operator for decelerating the vehicle during execution of the limit control, and
end the limit control and resume the vehicle speed maintaining control when the electronic control unit determines that the stop instructing traffic signal continuously instructs the vehicle to stop and an entrance reaching condition is met based on the image data during execution of the limit control, the entrance reaching condition being met when the vehicle reaches a position near an entrance to an intersection at which the stop instructing traffic signal is installed.

2. The vehicle control device according to claim 1, wherein the electronic control unit is configured to determine that the entrance reaching condition is met when the electronic control unit determines data that a stop line is present on a road surface ahead in the host vehicle lane based on the image, and a stop line distance between the vehicle and the stop line acquired based on the image data becomes equal to or less than a second threshold during execution of the limit control.

3. The vehicle control device according to claim 2, wherein the electronic control unit is configured to determine that the entrance reaching condition is met when the electronic control unit determines data that the stop line is not present based on the image, and the traffic signal distance becomes equal to or less than a third threshold that is smaller than the first threshold.

4. The vehicle control device according to claim 3, wherein the third threshold is set to a value that is larger than the second threshold.

* * * * *